United States Patent
Knechtel et al.

(10) Patent No.: US 11,852,021 B2
(45) Date of Patent: Dec. 26, 2023

(54) VARIABLE VANE AND METHOD FOR OPERATING SAME

(71) Applicant: Raytheon Technologies Corporation, Farmington, CT (US)

(72) Inventors: Kevin Knechtel, Amston, CT (US); Kenneth P. Clark, Glastonbury, CT (US); Stephen A. Hakenjos, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/861,931

(22) Filed: Jul. 11, 2022

(65) Prior Publication Data
US 2022/0341343 A1    Oct. 27, 2022

Related U.S. Application Data

(63) Continuation of application No. 17/140,604, filed on Jan. 4, 2021, now Pat. No. 11,384,656.

(51) Int. Cl.
| | | |
|---|---|---|
| F01D 17/16 | (2006.01) | |
| F02C 9/22 | (2006.01) | |
| F02C 7/06 | (2006.01) | |

(52) U.S. Cl.
CPC ......... *F01D 17/162* (2013.01); *F01D 17/167* (2013.01); *F02C 7/06* (2013.01); *F02C 9/22* (2013.01); *F05D 2240/50* (2013.01); *F05D 2260/56* (2013.01)

(58) Field of Classification Search
CPC ........ F01D 17/14; F01D 17/16; F01D 17/162; F01D 17/167; F02C 9/22; F05D 2260/56
See application file for complete search history.

(56) References Cited

U.S. PATENT DOCUMENTS

| | | |
|---|---|---|
| 3,295,827 A | 1/1967 | Chapman |
| 3,563,669 A | 2/1971 | Hockert |
| 3,887,297 A | 6/1975 | Welchek |
| 4,053,256 A | 10/1977 | Hertel |
| 4,856,962 A | 8/1989 | McDow |
| 4,995,786 A | 2/1991 | Wheeler |
| 5,520,511 A | 5/1996 | Loudet |
| 8,915,703 B2 | 12/2014 | Mohammed |
| 9,249,736 B2 | 2/2016 | Carroll |
| 10,808,568 B2 | 10/2020 | Dyer |
| 11,384,656 B1 * | 7/2022 | Knechtel .............. F01D 17/167 |
| 2005/0109011 A1 | 5/2005 | Courtot |
| 2016/0017739 A1 | 1/2016 | Firnhaber |
| 2016/0053692 A1 | 2/2016 | Izquierdo |

(Continued)

FOREIGN PATENT DOCUMENTS

DE    4208311 A1    9/1993

OTHER PUBLICATIONS

EP search report for EP22150257.8 dated Sep. 26, 2022.

*Primary Examiner* — Christopher R Legendre
(74) *Attorney, Agent, or Firm* — Getz Balich LLC

(57) ABSTRACT

A variable vane includes a first vane portion and a second vane portion adjacent the first vane portion. The second vane portion includes a trunnion projecting outward from a radial end of the second vane portion. The second vane portion is configured to rotate about a trunnion axis of the trunnion from a first rotational position to a second rotational position.

15 Claims, 10 Drawing Sheets

(56) References Cited

U.S. PATENT DOCUMENTS

| | | |
|---|---|---|
| 2016/0341068 A1 | 11/2016 | Robertson, Jr. |
| 2017/0191367 A1 | 7/2017 | Sak |
| 2017/0234152 A1 | 8/2017 | Jones |
| 2020/0080442 A1 | 3/2020 | Dyer |

* cited by examiner

VARIABLE VANE AND METHOD FOR OPERATING SAME

This application is a continuation of U.S. patent application Ser. No. 17/140,604 filed Jan. 4, 2021, which is hereby incorporated herein by reference in its entirety.

BACKGROUND

1. Technical Field

This disclosure relates generally to vane assemblies for rotational equipment, and more particularly to variable vane assemblies.

2. Background Information

Variable vanes, namely, vanes which are not fixed but pivot about axes such as to vary the angle of the vane airfoil, are sometimes used in gas turbine engine systems, such as compressors, to optimize compressor operability and/or efficiency over the compressor speed range. These variable vanes may include variable inlet guide vanes (IGV) located directly upstream of the first compressor stage, or variable vanes which form part of one or more of the subsequent downstream stages in a multistage compressor (ex: first compressor stage and/or second compressor stage, etc.). Variable vanes enable optimized compressor efficiency and/or operability by providing a close-coupled direction of the gas flow into the immediately downstream rotor stage, and/or may introduce swirl into the compressor rotor to improve low speed operability of the compressor, and thus the engine, as well as to increase the flow capacity at high speeds. There is a need for variable vane assemblies which further improve the efficiency of the associated equipment (e.g., a compressor) throughout the range of operational power conditions for the equipment.

SUMMARY

It should be understood that any or all of the features or embodiments described herein can be used or combined in any combination with each and every other feature or embodiment described herein unless expressly noted otherwise.

According to an aspect of the present disclosure, a variable vane includes a first vane portion and a second vane portion adjacent the first vane portion. The second vane portion includes a trunnion projecting outward from a radial end of the second vane portion. The second vane portion is configured to rotate about a trunnion axis of the trunnion from a first rotational position to a second rotational position.

In any of the aspects or embodiments described above and herein, the trunnion includes a button having a first button portion fixedly in contact with the radial end of the second vane portion and a second button portion detached from the second vane portion. The trunnion further includes a trunnion portion fixedly mounted to the second button portion at a cross-sectional center of the button and projecting radially outward from the button.

In any of the aspects or embodiments described above and herein, the button includes a button radius which is at least two times greater than a thickness of the second vane portion.

In any of the aspects or embodiments described above and herein, the second vane portion further includes a second trunnion projecting outward from a second radial end of the second vane portion, opposite the radial end. The second trunnion includes a second button having a third button portion fixedly in contact with the second radial end of the second vane portion and a fourth button portion detached from the second vane portion. The second trunnion further includes a trunnion portion fixedly mounted to the fourth button portion at a cross-sectional center of the second button and projecting radially outward from the second button.

In any of the aspects or embodiments described above and herein, the button has a first radius and the second button has a second radius which is smaller than the first radius.

In any of the aspects or embodiments described above and herein, the second vane portion is mounted to a spherical bearing at a second radial end, opposite the radial end.

In any of the aspects or embodiments described above and herein, the trunnion is disposed in a slot within which the trunnion is configured to translate between a first slot end corresponding to a first axial position of the second vane portion and a second slot end corresponding to a second axial position of the second vane portion. The second vane portion is configured to rotate about the trunnion axis of the trunnion from the first rotational position to the second rotational position as the trunnion translates from the first slot end to the second slot end.

In any of the aspects or embodiments described above and herein, the first axial position is a proximate position of the second vane portion with respect to the first vane portion and the second axial position is a distal position of the second vane portion with respect to the first vane portion.

In any of the aspects or embodiments described above and herein, the first vane portion includes a first forward axial end and a first aft axial end opposite the first forward axial end. The first slot end is axially forward of the first aft axial end and the second slot end is axially aft of the first aft axial end.

In any of the aspects or embodiments described above and herein, the second vane portion includes a second forward axial end and a second aft axial end opposite the second forward axial end. The second aft axial end maintains a substantially constant axial position as the trunnion translates from the first slot end to the second slot end.

In any of the aspects or embodiments described above and herein, the slot extends in a substantially axial direction between the first slot end and the second slot end.

In any of the aspects or embodiments described above and herein, the slot is curved between the first slot end and the second slot end.

In any of the aspects or embodiments described above and herein, the curved slot has a concave side which faces a pressure side of the variable vane and a convex side which faces a suction side of the variable vane.

In any of the aspects or embodiments described above and herein, the first aft axial end of the first vane portion includes a vane surface which defines a recess within which the second vane portion is configured to be located. The vane surface extends between a first edge and a second edge located axially aft of the first edge. The vane surface has a concave shape between the first edge and the second edge which faces the second vane portion.

In any of the aspects or embodiments described above and herein, the variable vane further includes a sync ring disposed about an axial centerline and configured to rotate in a circumferential direction about the axial centerline. The second vane portion further includes a geared cam in rotational communication with the trunnion. The geared cam is configured to engage the sync ring and effect translation of the trunnion between the first slot end and the second slot end based on a rotation of the sync ring.

In any of the aspects or embodiments described above and herein, the sync ring is located axially forward of the slot.

In any of the aspects or embodiments described above and herein, the sync ring is located axially aft of the slot.

In any of the aspects or embodiments described above and herein, the second vane portion is configured to rotate at least forty degrees between a fully open position and a fully closed position.

According to another aspect of the present disclosure, a gas turbine engine having an axial centerline includes a variable vane assembly including a plurality of variable vanes disposed about the axial centerline. Each variable vane of the plurality of variable vanes includes a first vane portion fixed relative to the axial centerline and a second vane portion disposed axially aft of and adjacent the first vane portion. The second vane portion includes a trunnion projecting outward from a radial end of the second vane portion. The second vane portion is configured to rotate about a trunnion axis of the trunnion from a first rotational position to a second rotational position.

In any of the aspects or embodiments described above and herein, the variable vane assembly is located in at least one of a fan section or a compressor section of the gas turbine engine.

In any of the aspects or embodiments described above and herein, the gas turbine engine further includes an actuation system connected to the trunnion. The actuation system is configured to effect one or both of a rotation or an axial translation of the trunnion.

According to another aspect of the present disclosure, a method for operating a variable vane includes providing a first vane portion of the variable vane and a second vane portion of the variable vane adjacent the first vane portion. The second vane portion includes a trunnion projecting outward from a radial end of the second vane portion. The method further includes rotating the second vane portion, relative to a trunnion axis of the trunnion, from a first rotational position to a second rotational position.

In any of the aspects or embodiments described above and herein, the method further includes translating the trunnion of the second vane portion from a first slot end of a slot corresponding to a first axial position of the second vane portion to a second slot end of the slot corresponding to a second axial position of the second vane portion as the second vane portion rotates from the first rotational position to the second rotational position.

The present disclosure, and all its aspects, embodiments and advantages associated therewith will become more readily apparent in view of the detailed description provided below, including the accompanying drawings.

DETAILED DESCRIPTION

Figure 1:
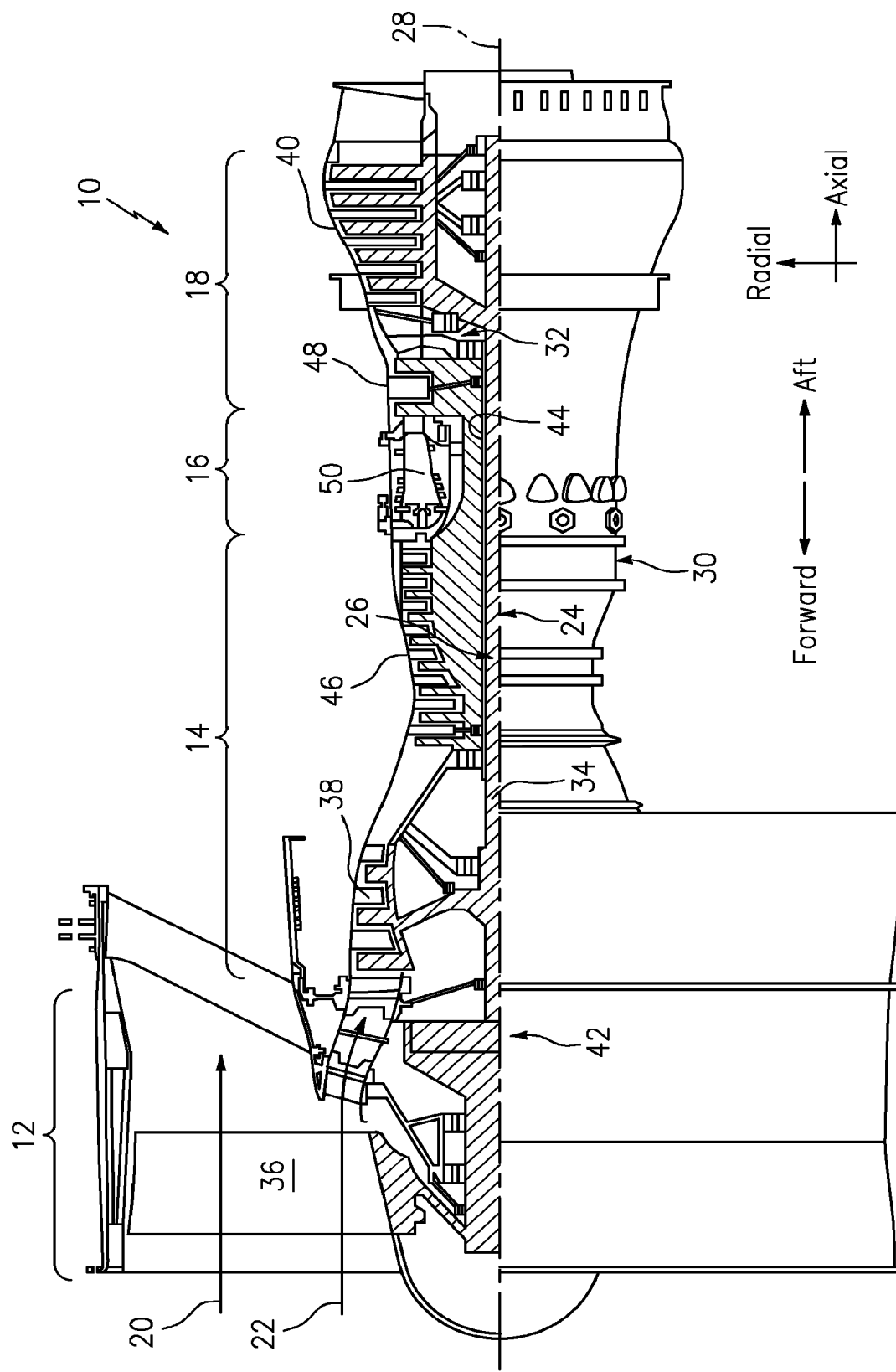
FIG. 1 illustrates a side cutaway view of a gas turbine engine, in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flow path 20 while the compressor section 14 drives air along a core flow path 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures or turbojets with no bypass flowpath.

The gas turbine engine 10 generally includes a low-pressure spool 24 and a high-pressure spool 26 mounted for rotation about an axial centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the axial centerline 28. The first shaft 34 and the second shaft 44 are concentric and rotate via the one or more bearing systems 32 about the axial centerline 28 which is collinear with respective axial centerlines of the first and second shafts 34, 44.

Airflow along the core flow path 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively, in response to the expansion.

Figure 2A:
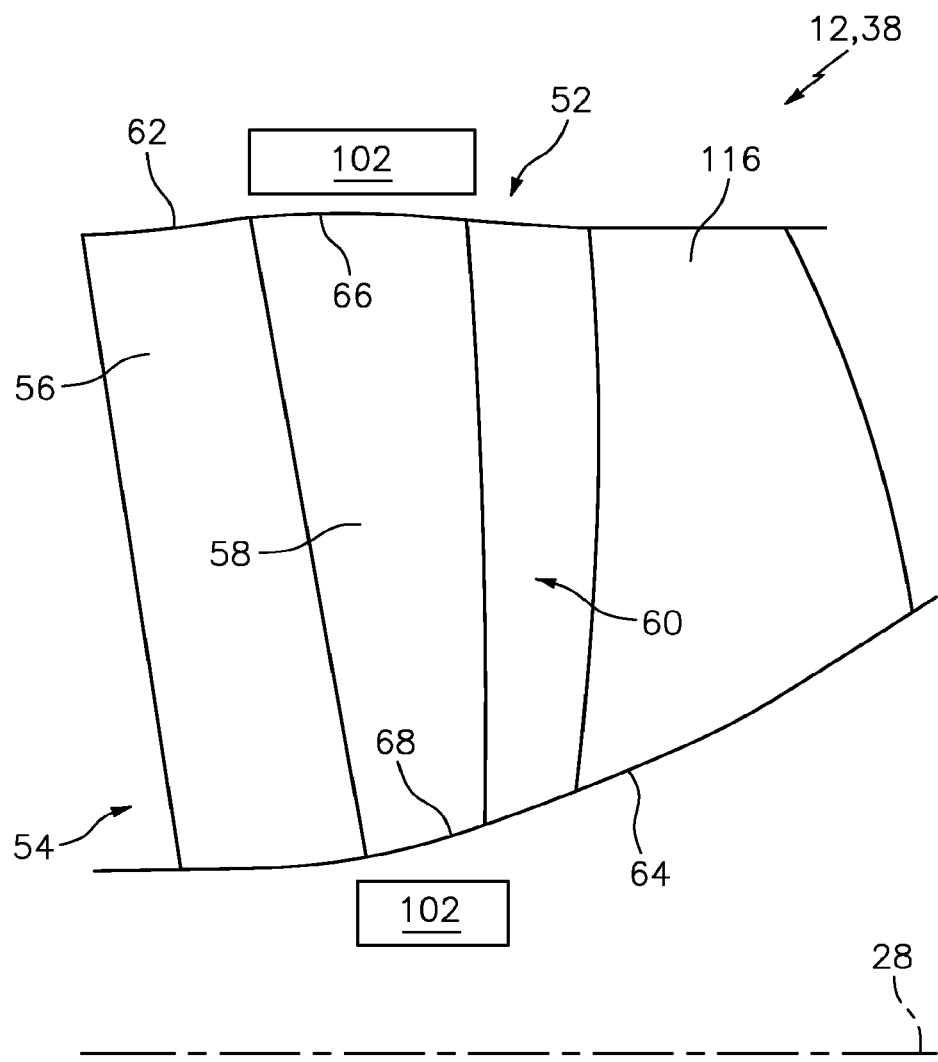
FIG. 2A illustrates a side, cross-sectional view of a portion of a fan assembly or low-pressure compressor of the gas turbine engine of FIG. 1, in accordance with one or more embodiments of the present disclosure.
Figure 2B:
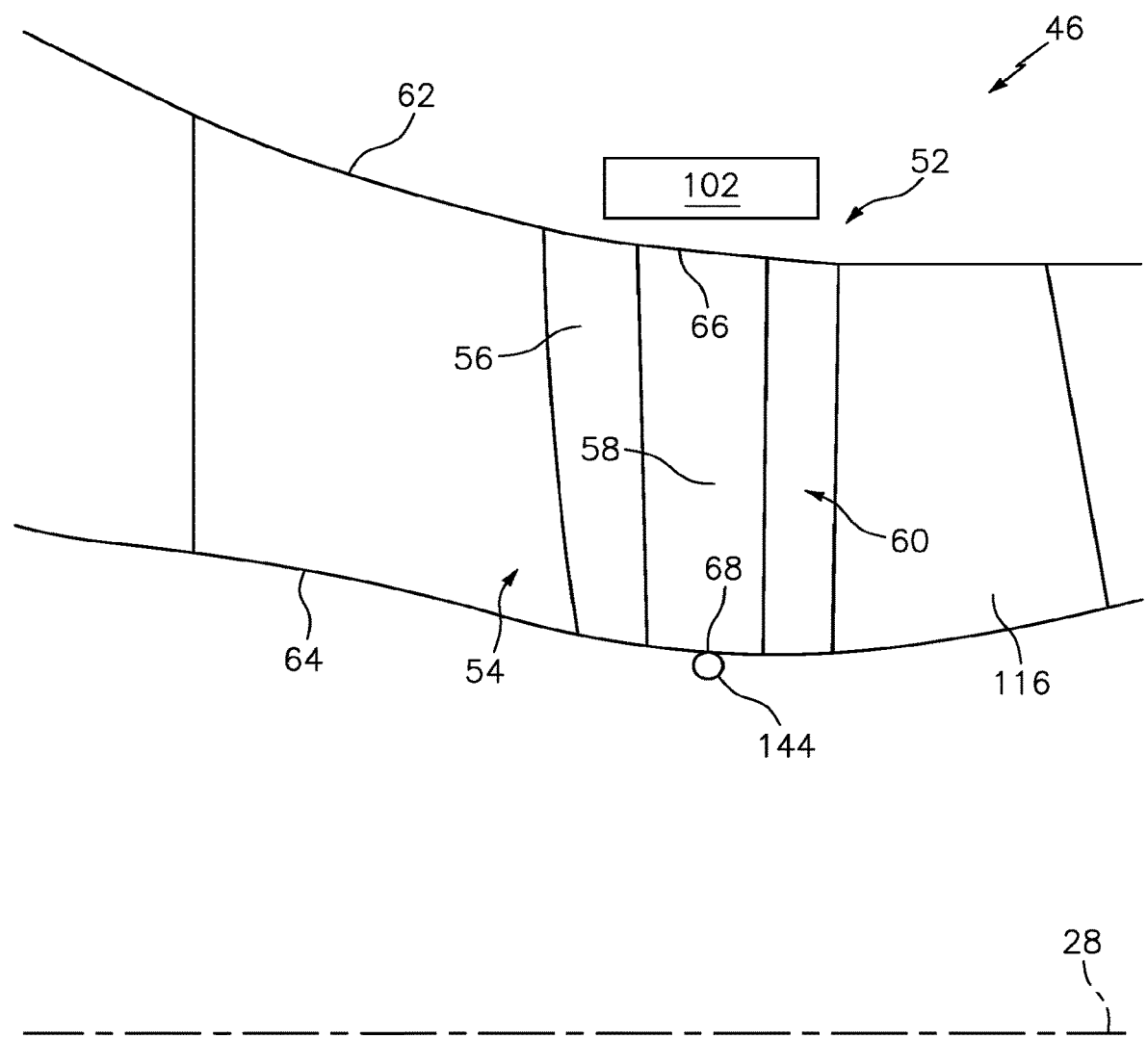
FIG. 2B illustrates a side, cross-sectional view of a portion of a high-pressure compressor of the gas turbine engine of FIG. 1, in accordance with one or more embodiments of the present disclosure.

Referring to FIGS. 2A and 2B, the gas turbine engine 10 may include a variable vane assembly 52 comprising a plurality of variable vanes 54 disposed about the axial centerline 28. The variable vane assembly 52 may be located axially adjacent and forward of a first rotor stage 116. Each variable vane 54 may include a first vane portion 56 which is fixed (e.g., relative to the axial centerline 28) and a second vane portion 58 which is disposed axially aft of and adjacent the first vane portion 56. As will be discussed in further detail, the second vane portion 58 of the variable vane 54 is configured to move relative to the first vane portion 56. The variable vane assembly 52 may be included in the fan section 12 and/or the low-pressure compressor 38 of the compressor section 14 of the gas turbine engine 10 as shown, for example, in FIG. 2A. The variable vane assembly 52 may additionally or alternatively be included in the high-pressure compressor 46 of the compressor section 14 of the gas turbine engine 10 as shown, for example, in FIG. 2B.

The variable vane assembly 52 may be located in an annular passage 60 defined between an outer radial structure and an inner radial structure. The outer radial structure and the inner radial structure may be a casing, shroud, duct, or other structural assembly and will be referred to herein as an outer casing 62 and an inner casing 64. The first vane portion 56 of each variable vane 54 may be fixedly connected to the outer casing 62 and the inner casing 64 and may be configured to provide structural support to the outer casing 62 and the inner casing 64 (e.g., the first vane portion 56 may function as a strut). As will be discussed in further detail, the second vane portion 58 of each variable vane 54 may be moveably mounted to the outer casing 62 and the inner casing 64 and configured to move relative to the respective first vane portion 56. The second vane portion 58 includes an outer radial end 66 disposed adjacent the outer casing 62 and an inner radial end 68 disposed opposite the outer radial end 66 and adjacent the inner casing 64. The variable vane assembly 52 may include an actuation system 102 (e.g., a hydraulic actuation system) configured to effect movement of the second vane portion 58. The actuation system 102 may be located radially outside the outer casing 62 and/or radially inside the inner casing 64 and in communication with one or both of the radial ends 66, 68 of the second vane portion 58 to effect movement thereof. The present disclosure is not limited to any particular actuation system or any particular method for effecting movement of the second vane portion 58.

Figure 3:
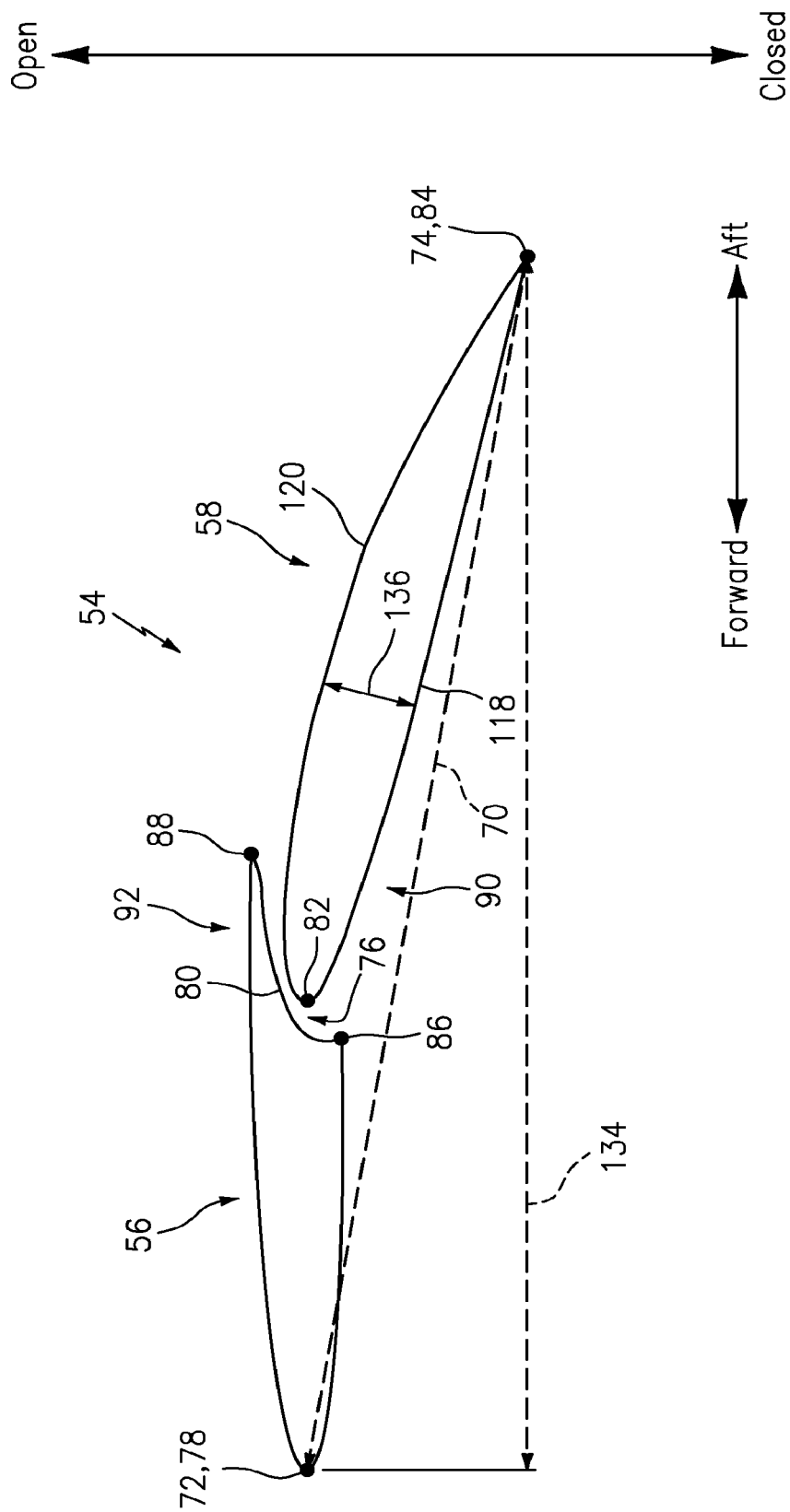
FIG. 3 illustrates a top, cross-sectional view of an exemplary variable vane, in accordance with one or more embodiments of the present disclosure.

Referring to FIG. 3, the variable vane 54 includes a chord length 70 extending from a leading edge 72 of the variable vane 54 to a trailing edge 74 of the variable vane 54. The variable vane 54 includes an axial chord length 134 extending in an axial direction from the leading edge 72 of the variable vane 54 to the trailing edge 74 of the variable vane 54. The variable vane 54 further includes a gap 76 disposed between the first vane portion 56 and the second vane portion 58. The first vane portion 56 includes a first forward axial end 78 and a first aft axial end 80 opposite the first forward axial end 78. The first forward axial end 78 may correspond to the leading edge 72 of the variable vane 54. The second vane portion 58 includes a second forward axial end 82 and a second aft axial end 84 opposite the second forward axial end 82. The second aft axial end 84 may correspond to the trailing edge 74. The first aft axial end 80 of the first vane portion 56 is defined by a vane surface which defines a recess within which the second vane portion 58 (e.g., the second forward axial end 82) is configured to be located. The vane surface may extend between a first edge 86 of the first aft axial end 80 and a second edge 88 of the first aft axial end 80 located axially aft of the first edge 86. The vane surface may have a concave shape between the first edge 86 and the second edge 88 which faces the second vane portion 58. The second vane portion 58 includes a first face 118 extending from the second forward axial end 82 to the second aft axial end 84 and a second face 120 opposite the first face 118 and extending from the second forward axial end 82 to the second aft axial end 84. The second vane portion 58 includes a thickness 136 between the first face 118 and the second face 120. As used herein, the thickness 136 refers to a location of maximum thickness between first face 118 and the second face 120. The variable vane 54 additionally includes a pressure side 90 and a suction side 92 opposite the pressure side 90. During operation of the gas turbine engine 10, some amount of fluid may flow through the gap 76 in a direction from the pressure side 90 to the suction side 92.

Referring to FIGS. 3-8, aspects of the present disclosure include the second vane portion 58 of the variable vane 54 which is configured to rotate from a first rotational position to a second rotational position between or including an open position (e.g., a fully open position) and a closed position (e.g., a fully closed position) of the second vane portion 58 as the second vane portion 58 axially translates relative to the first vane portion 56 of the variable vane 54. For example, the second vane portion 58 may rotate from the first rotational position to the second rotational position, in a direction from the open position to the closed position, as the second vane portion 58 axially translates relative to the first vane portion 56 of the variable vane 54. Accordingly, the chord length 70 of the variable vane 54 may be adjusted to provide greater efficiency during various power conditions of the gas turbine engine 10. During relatively higher power operations of the gas turbine engine 10, the second vane portion 58 may be positioned toward the open position wherein the second vane portion 58 may be substantially aligned with (e.g., parallel to) the first vane portion 56, thereby minimizing the pressure loss of a fluid passing the variable vane assembly 52. During relatively lower power operations of the gas turbine engine 10, the second vane portion may be positioned toward closed position to reduce the flow of the fluid through the variable vane assembly 52 and provide turning to the fluid. Thus, depending on the operating conditions of the gas turbine engine 10, the second vane portion 58 may be selectively positioned in the open position, the closed position, or a range of intermediate positions between the open position and the closed position by rotating the second vane portion 58. As used herein, the term "open position" means the maximum rotational position of the second vane portion 58 in the direction of the suction side 92 of the variable vane 54 and the term "closed position" means the maximum rotational position of the second vane portion 58 in the direction of the pressure side 90 of the variable vane 54. In various embodiments, the second vane portion 58 may be configured to rotate between 0 and 40 degrees from the open position to the closed position. In various embodiments, the second vane portion 58 may be configured to rotate between 0 and 50 degrees from the open position to the closed position. In various embodiments, the second vane portion 58 may be configured to rotate greater than 50 degrees from the open position to the closed position.

Referring to FIGS. 4-7, top views of the variable vane 54 in multiple positions are shown illustrating the outer radial end 66 of the second vane portion 58. The second vane portion 58 includes a trunnion 94 projecting radially outward from the outer radial end 66. The trunnion 94 is disposed in a slot 96 defined in the outer casing 62 and is in communication with the actuation system 102 as discussed above (see FIGS. 2A and 2B). The trunnion 94 is configured to translate between a first slot end 98 of the slot 96 corresponding to a first axial position of the second vane portion 58 and a second slot end 100 of the slot 96 corresponding to a second axial position of the second vane portion 58, by operation of the actuation system 102. The first slot end 98 may be an axially forward end of the slot 96 while the second slot end 100 may be an axially aft end of the slot 96. The first axial position of the second vane portion 58 may be a proximate position of the second vane portion 58 (e.g., the second forward axial end 82) with respect to the first vane portion 56 and the second axial position of the second vane portion 58 may be a distal position of the second vane portion (e.g., the second forward axial end 82) with respect to the first vane portion 56. In various embodiments, the first slot end 98 may be axially forward of the first aft axial end 80 of the first vane portion 56 and the second slot end 100 may be axially aft of the first aft axial end 80 of the first vane portion 56. The trunnion 94 may be located in an axially forward region of the second vane portion 58 and may be axially spaced aft of the second forward axial end 82 of the second vane portion 58, using the open position of the second vane portion 58 as a reference. For example, in various embodiments, the trunnion 94 may be located in the axially forward 50 percent of the second vane portion 58 by length from the second forward axial end 82 to the second aft axial end 84. In various embodiments, the trunnion 94 may be located in the axially forward 25 percent of the second vane portion 58 by length from the second forward axial end 82 to the second aft axial end 84. In various embodiments, the trunnion 94 may be located in the axially forward 10 percent of the second vane portion 58 by length from the second forward axial end 82 to the second aft axial end 84.

The second vane portion 58 is further configured to rotate about a trunnion axis 104 of the trunnion 94 from an open position to a closed position as the trunnion 94 translates from the first slot end 98 to the second slot end 100. Similarly, the second vane portion 58 is configured to rotate about the trunnion axis 104 of the trunnion 94 from the closed position to the open position as the trunnion 94 translates from the second slot end 100 to the first slot end 98. As the trunnion 94 translates from the first slot end 98 toward the second slot end 100 and the second vane portion 58 rotates in a direction from the open position to the closed position, the chord length 70 of the variable vane 54 increases while a circumferential gap (e.g., a circumferential distance) between circumferentially adjacent variable vanes 54 of the variable vane assembly 52 decreases. Accordingly, a ratio of the circumferential gap to chord length 70 may decrease as the second vane portion 58 transitions from the open position to the closed position.

While the operation of the second vane portion 58 is explained above with respect to the outer radial end 66 of the second vane portion 58, it should be understood that the inner radial end 68 may additionally include a trunnion disposed in a respective slot of the inner casing 64 and may be in communication with an actuation system such as the actuation system 102 or an actuation system which is independent of the actuation system 102. The trunnion and respective slot of the inner casing 64 may have a configuration which is substantially the same as corresponding trunnions 94 and slots 96 which will be described in greater detail below. In various other embodiments, the inner radial end 68 of the second vane portion 58 may be movably mounted to the inner casing 64 by, for example, a spherical bearing 144 or other mounting configuration allowing some relative movement between the inner radial end 68 of the second vane portion 58 and the inner casing 64. The variable vane assembly 52 of FIG. 2A is illustrated as having the actuation system 102 located at the inner radial end 68 while the variable vane assembly 52 of FIG. 2B is illustrated as having the spherical bearing 144 located at the inner radial end 68, however, it should be understood that the inner radial end 68 is not limited to any particular mounting configuration and the actuation system 102, the spherical bearing 144, or another mounting configuration may be used at the inner radial end 68 for any of the aspects or embodiments described herein.

In various embodiments, the location of the trunnion 94 at the first slot end 98 may correspond to the second vane portion 58 being in the open position while the location of the trunnion 94 at the second slot end 100 may correspond to the second vane portion 58 being in the shut position. In various other embodiments, the second vane portion 58 may be configured to rotate independent of translation of the trunnion 94 and/or the trunnion 94 may be configured to translate independent of rotation of the second vane portion 58.

Figure 4:
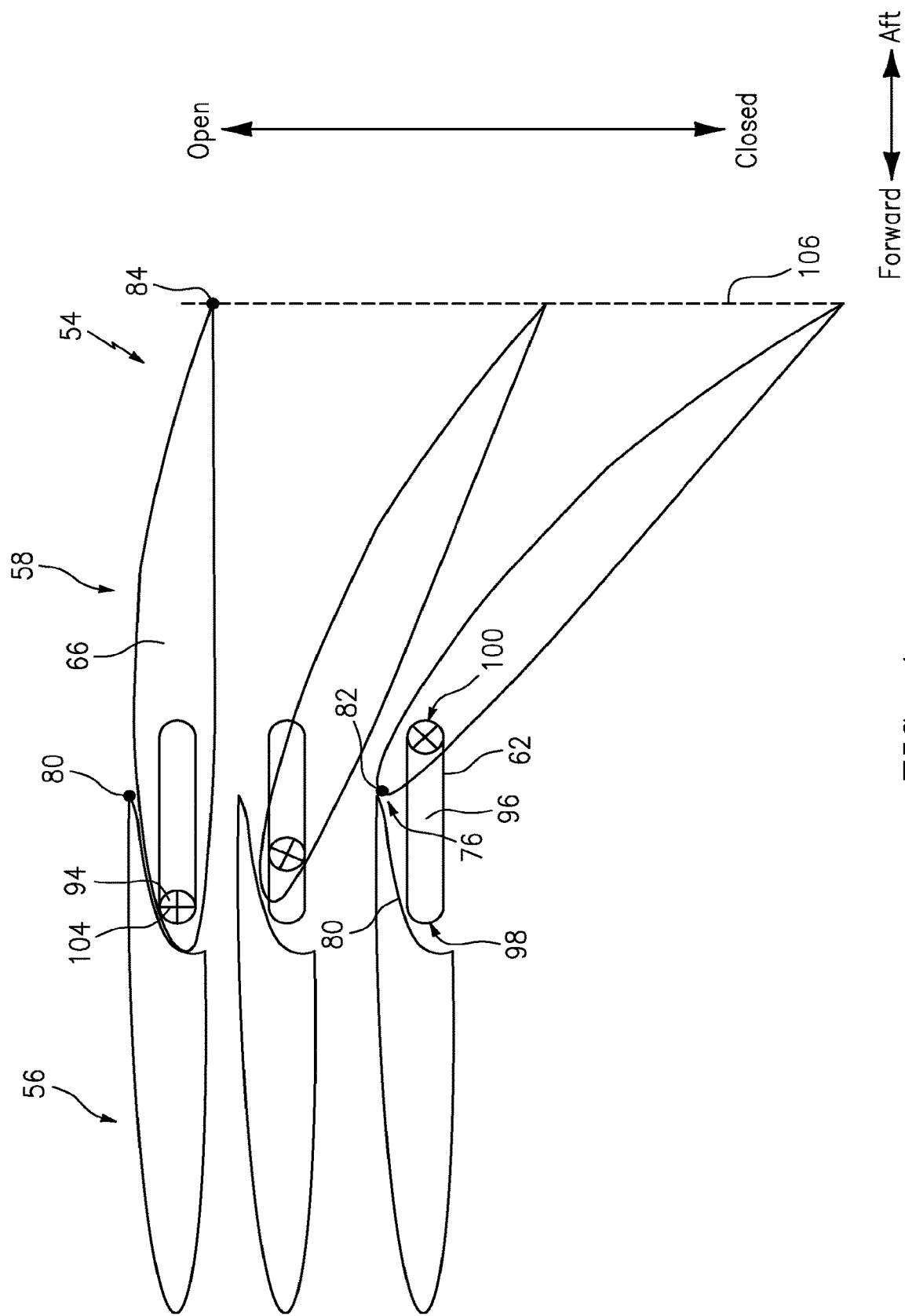
FIG. 4 illustrates a top, cross-sectional view of an exemplary variable vane in several positions, in accordance with one or more embodiments of the present disclosure.

Referring to FIG. 4, in various embodiments, the slot 96 extends in a straight (i.e., linear) direction from the first slot end 98 to the second slot end 100. The slot 96 may extend, for example, in a substantially axial direction from the first slot end 98 to the second slot end 100. As used herein, the term "substantially" with regard to an angular relationship refers to the noted angular relationship (e.g., "parallel")+/−5 degrees. In operation, as the trunnion 94 translates from the first slot end 98 to the second slot end 100, or anywhere therebetween, the rotation and axial movement of the second vane portion 58 may result in the second aft axial end 84 of the second vane portion 58 maintaining a substantially constant axial position (generally indicated as axial position 106) while minimizing the gap 76 between the second forward axial end 82 of the second vane portion 58 and the first aft axial end 80 of the first vane portion 56. As used herein, the term "substantially" with respect to the constant axial position refers to the constant axial position+/−one percent of the axial chord length 134 of the variable vane 54. As previously discussed, the variable vane assembly 52 may be located axially adjacent and forward of a first rotor stage 116 (see FIGS. 2A and 2B). By maintaining the second aft axial end 84 of the second vane portion 58 in a substantially constant axial position 106 throughout the range of motion of the second vane portion 58, the variable vane assembly 52 may be located closer to the first rotor stage 116 than would be acceptable with conventional variable vane assemblies, improving efficiency and performance of the rotational equipment. In various embodiments, the axial position of the second aft axial end 84 of the second vane portion 58 may be maintained within an axial range of +/−five percent of the axial chord length 134 over at least fifty degrees of rotation of the second vane portion 58. For example, the aft axial end 84 of the second vane portion 58 may be maintained within an axial range of +/−one percent of the axial chord length 134 per ten degrees of rotation of the second vane portion 58 between a first rotational position and a second rotational position.

Figure 5:
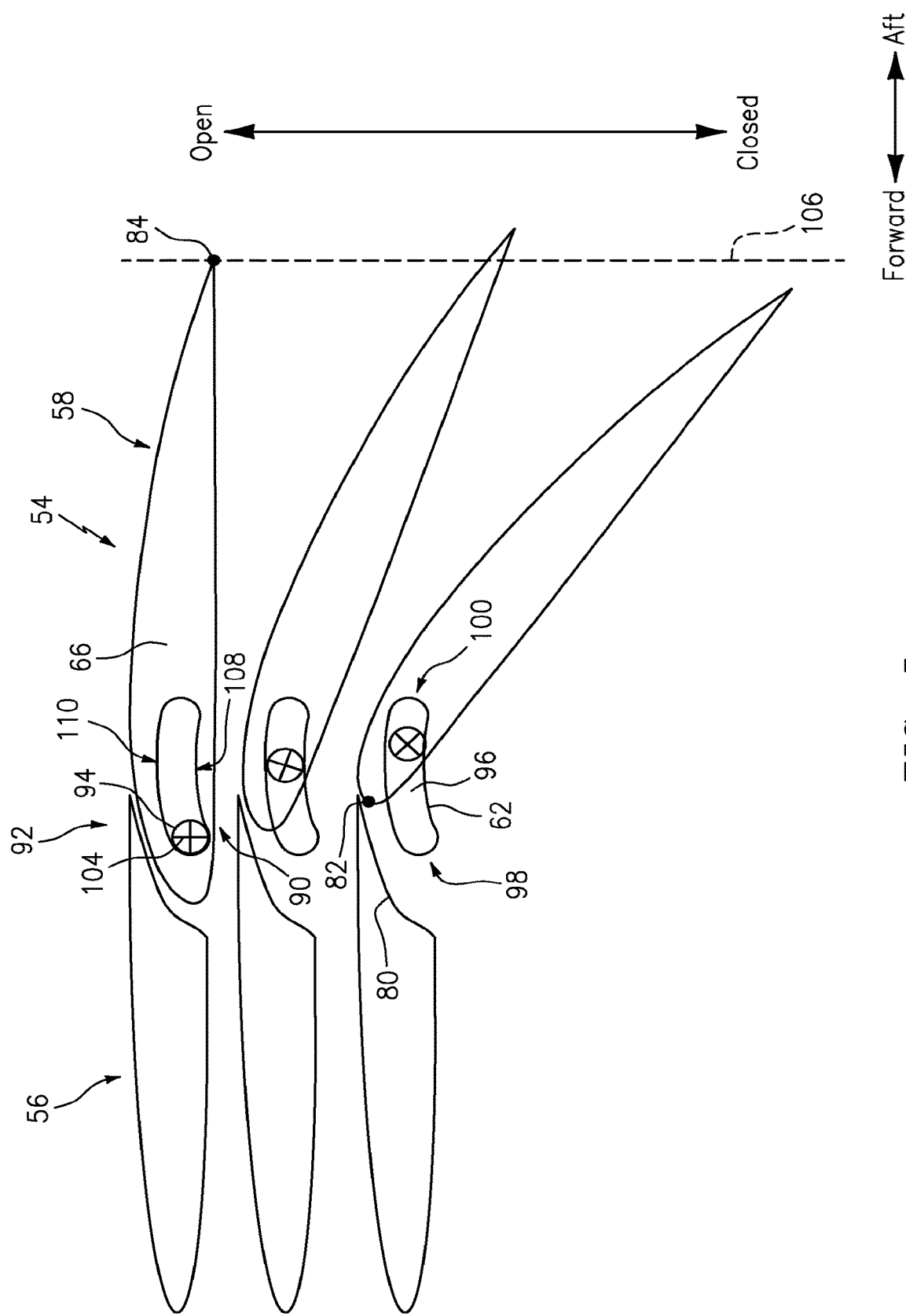
FIG. 5 illustrates a top, cross-sectional view of an exemplary variable vane in several positions, in accordance with one or more embodiments of the present disclosure.

Referring to FIG. 5, in various embodiments, the slot 96 may be curved between the first slot end 98 and the second slot end 100. For example, as shown in FIG. 5, the curved slot may have a concave side 108 which faces the pressure side 90 of the variable vane 54 and a convex side 110, opposite the concave side 108, which faces the suction side 92 of the variable vane 54. The curved slot 96 configuration may allow a smaller gap 76 between the second forward axial end 82 of the second vane portion 58 and the first aft axial end 80 of the first vane portion 56 throughout the range of motion of the second vane portion 58, in comparison to the straight slot 96 configuration of FIG. 4. However, as can be seen in FIG. 5, the curved slot 96 configuration may result in greater variation of the axial position of the second aft axial end 84 of the second vane portion 58 throughout its range of motion, in comparison to the straight slot 96 configuration of FIG. 4.

Figure 6:
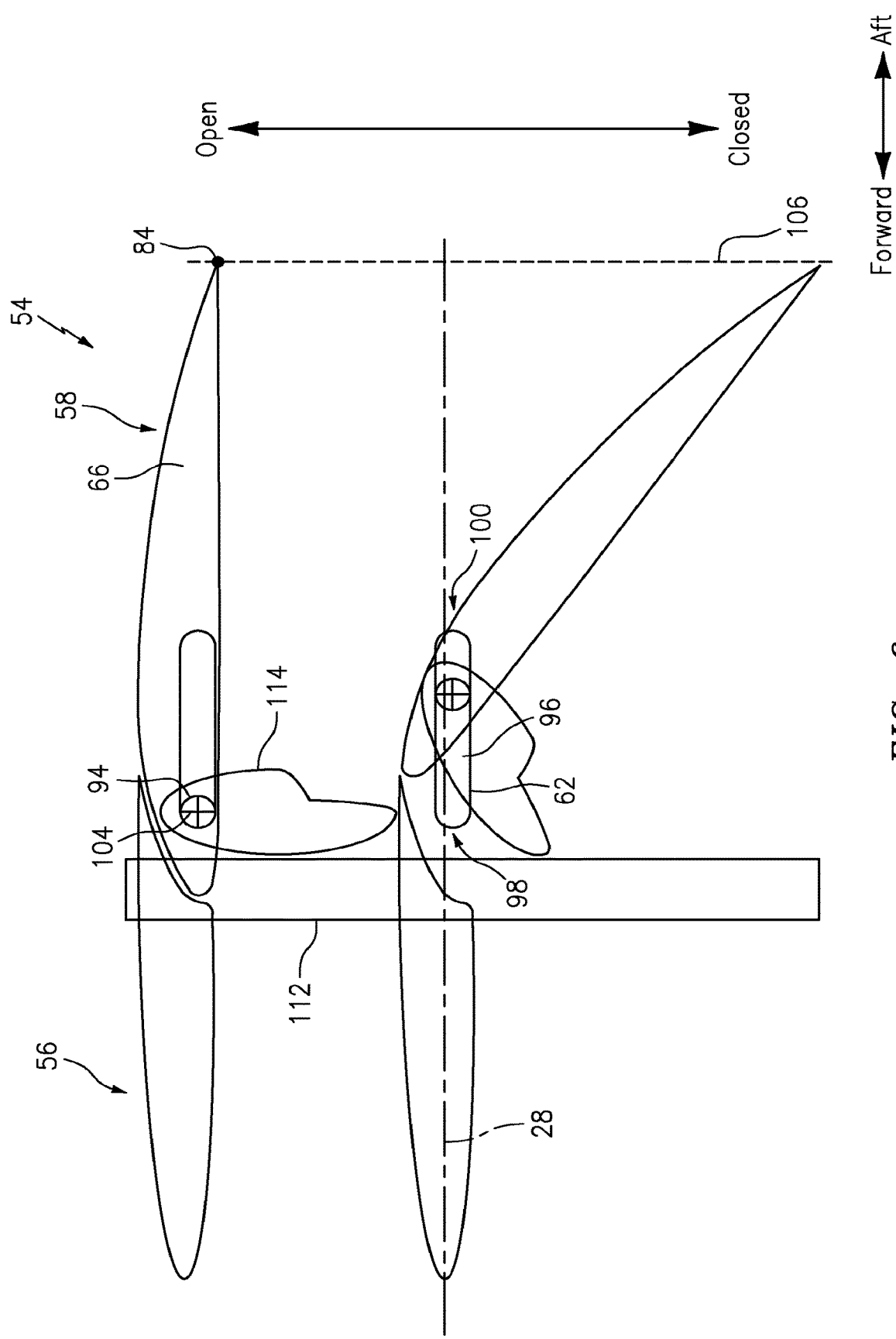
FIG. 6 illustrates a top, cross-sectional view of an exemplary variable vane in several positions, in accordance with one or more embodiments of the present disclosure.
Figure 7:
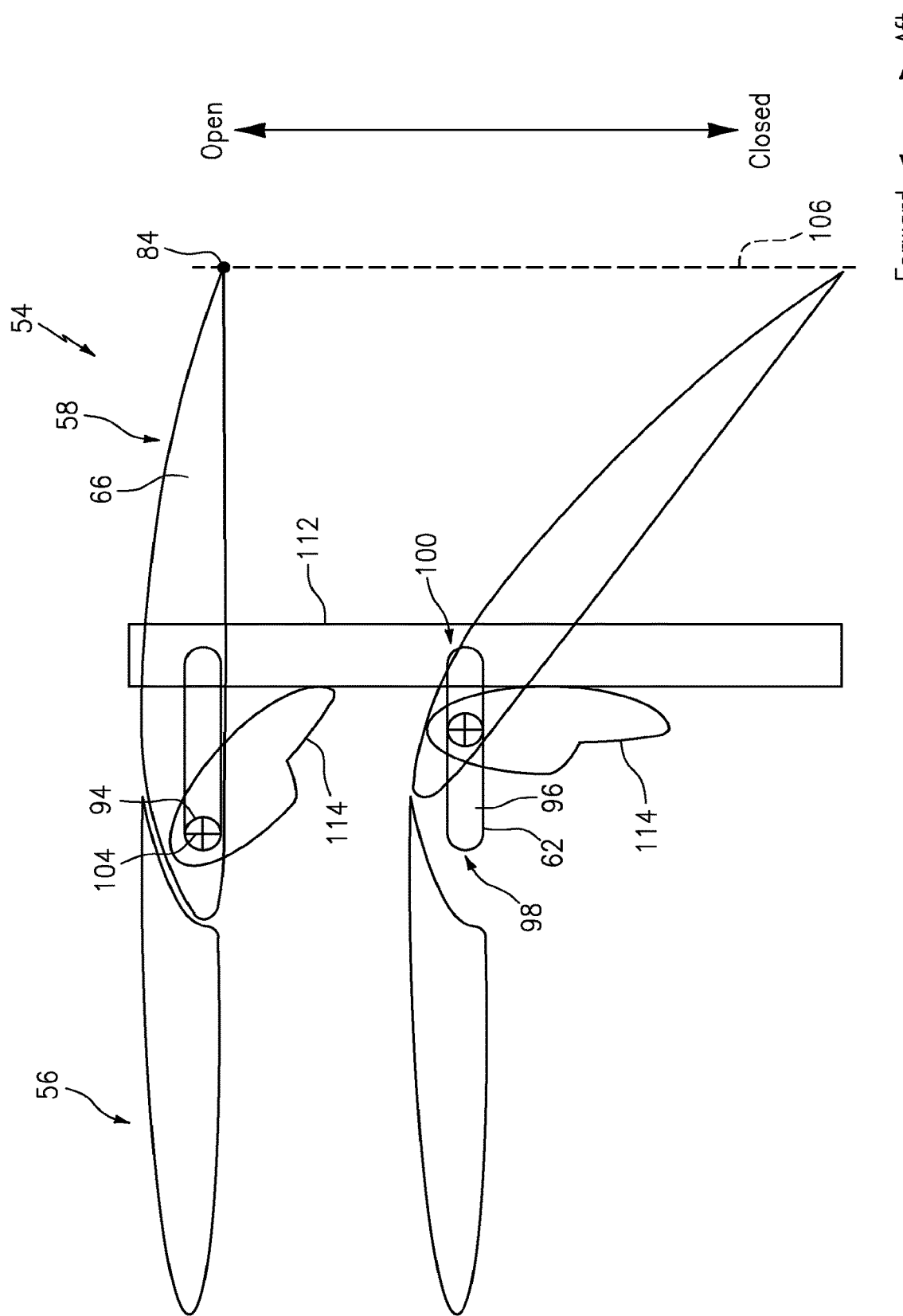
FIG. 7 illustrates a top, cross-sectional view of an exemplary variable vane in several positions, in accordance with one or more embodiments of the present disclosure.

Referring to FIGS. 6 and 7, in various embodiments, the variable vane assembly 52 may include a sync ring 112 disposed about the axial centerline 28 and configured to rotate in a circumferential direction about the axial centerline 28. The second vane portion 58 may further include a geared cam 114 (e.g., a geared "French-curve" cam) in rotational communication with the trunnion 94. The geared cam 114 may be configured to engage the sync ring 112 and effect translation of the trunnion 94 between the first slot end 98 and the second slot end 100 of the slot 96 based on the circumferential rotation of the sync ring 112. Accordingly, the sync ring 112 and geared cam 114 may effect axial and rotational movement of the second vane portion 58 instead of the actuation system 102 in communication with the trunnion 94. In various embodiments, the sync ring 112 may be located axially forward of the slot 96 (see FIG. 6). In various other embodiments, the sync ring 112 may be located axially aft of the slot 96 (see FIG. 7). The location of the sync ring 112 axially aft of the slot 96 may allow the aerodynamic load on the second vane portion 58 to cause the trunnion 94 and geared cam 114 to remain engaged with the sync ring 112 As shown in FIGS. 6 and 7, the variable vane assembly 52 includes a slot 96 having a straight configuration similar to that shown in FIG. 4, however, it should be understood that the slot 96 is not limited to this configuration and may have an alterative configuration such as the curved slot 96 of shown in FIG. 5. The use of a sync ring 112 and geared cam 114 may provide for a reduction in weight of the variable vane assembly 52 in comparison to a variable vane assembly and actuation system using vane arms to effect movement of a second vane portion.

Figure 8:
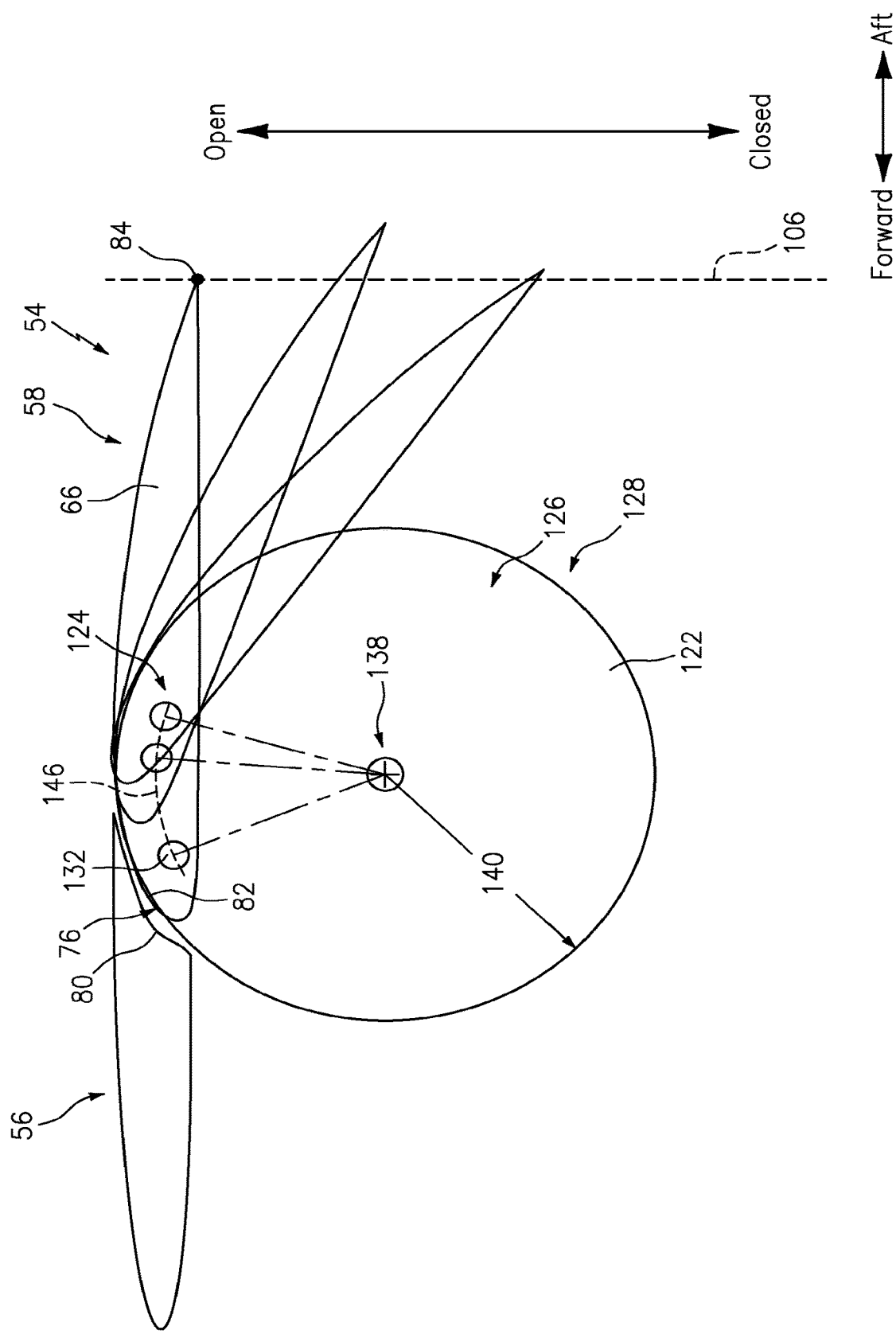
FIG. 8 illustrates a top, cross-sectional view of an exemplary variable vane in several positions, in accordance with one or more embodiments of the present disclosure.

Referring to FIG. 8, a top view of the variable vane 54 in multiple positions is shown illustrating the outer radial end 66 of the second vane portion 58. In various embodiments, the second vane portion 58 includes a trunnion 128 projecting outward from the outer radial end 66 of the second vane portion 58. The trunnion 128 includes a button 122 having a first portion 124 fixedly in contact with the outer radial end 66 of the second vane portion 58 and a second portion 126 detached from (e.g., not in contact with) the second vane portion 58. The trunnion 128 further includes a trunnion portion 138 which is fixedly mounted to the second portion 126 of the button 122 at a cross-sectional center of the button 122 and projects radially outward from the button 122. The trunnion 128, via the trunnion portion 138, is in communication with the actuation system 102 as discussed above (see FIGS. 2A and 2B) and is configured to rotate by operation of the actuation system 102. Thus, the second vane portion 58 is configured to rotate about a trunnion axis 130 of the trunnion 128 between the open position and the closed position. The trunnion axis 130 may be spaced axially aft of the first vane portion 56 and may be spaced circumferentially from the outer radial end 66. Rotation of the trunnion 128 about the trunnion axis 130 by the actuation system 102 causes the button 122 and, therefore, the second vane portion 58 to move from the first axial position to the second axial position, as shown by the movement of reference point 132 along a reference path 146, while the second vane portion 58 also rotates from a first rotational position to a second rotational position. As with the curved slot 96 configuration discussed above, the button 122 configuration of FIG. 8 may allow a smaller gap 76 between the second forward axial end 82 of the second vane portion 58 and the first aft axial end 80 of the first vane portion 56 throughout the range of motion of the second vane portion 58, in comparison to the straight slot 96 configuration of FIG. 4. However, as can be seen in FIG. 8, the button 122 configuration may result in greater variation of the axial position of the second aft axial end 84 of the second vane portion 58 throughout its range of motion, in comparison to the straight slot 96 configuration of FIG. 4.

In various embodiments, a radius 140 of the button 122 may be greater than two times the thickness 136 of the second vane portion 58 (see FIG. 3). For example, the radius 140 may be between two times and three times the thickness 136. In various embodiments, the radius 140 may be greater than three times the thickness 136. For example, the radius 140 may be between two times and ten times the thickness 136. In various other embodiments, the radius 140 may be greater than ten times the thickness 136. The enlarged radius 140 of the button 122, relative to the thickness 136 of the second vane portion 58 for example, may promote axial movement of the second vane portion 58 in addition to rotation of the second vane portion, thereby allowing the chord length 70 of the variable vane 54 to increase as the second vane portion 58 rotates in a direction from the open position toward the closed position. The button 122 size (e.g., radius 140) and/or shape may be selected to provide a preferred reference path for passing air flow as well as a preferred length (e.g., chord length 70) variation of the variable vane 54 along the range of rotation of the second vane portion 58.

Figure 9A:
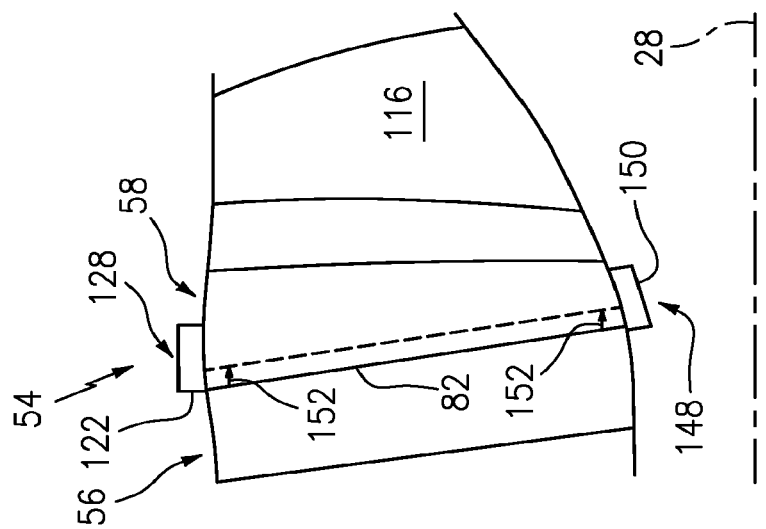
FIG. 9A illustrates a side, cross-sectional view of an embodiment of the variable vane of FIG. 8, in accordance with one or more embodiments of the present disclosure.
Figure 9B:
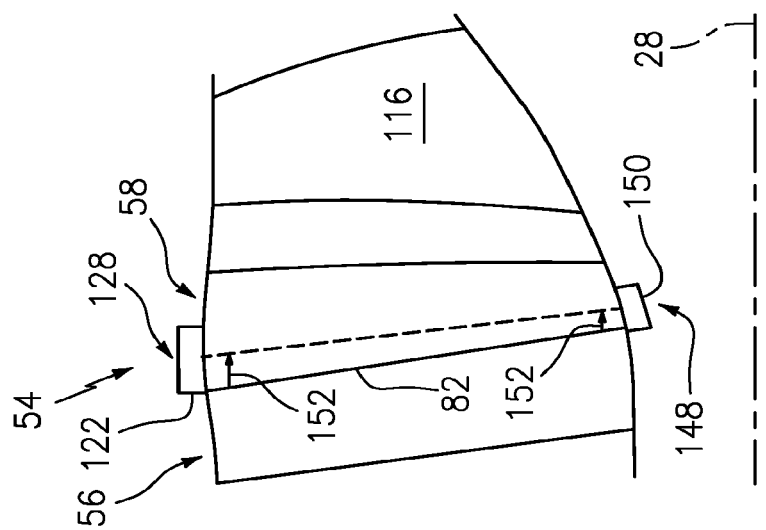
FIG. 9B illustrates a side, cross-sectional view of an embodiment of the variable vane of FIG. 8, in accordance with one or more embodiments of the present disclosure.
Figure 9C:
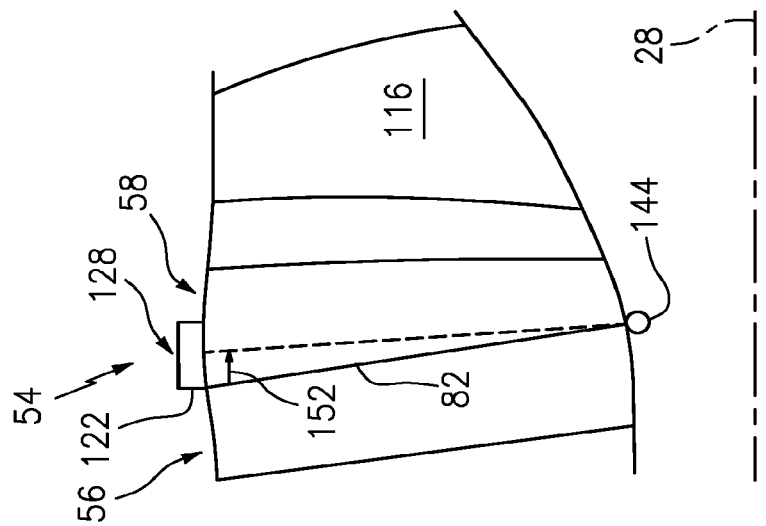
FIG. 9C illustrates a side, cross-sectional view of an embodiment of the variable vane of FIG. 8, in accordance with one or more embodiments of the present disclosure.

Referring to FIGS. 8 and 9A-C, in various embodiments, the second vane portion 58 may include a second trunnion 148 projecting outward from the inner radial end 68 of the second vane portion 58. The second trunnion 148 includes a second button 150 and may have a configuration that is substantially the same as the trunnion 128. In various embodiments, and as shown in FIG. 9A, the second button 150 may have a radius and shape which is the same as the button 122. Accordingly, the second forward axial end 82 of the second vane portion 58 may have an axial displacement 152 which is substantially constant along the radial length of the second vane portion 58 as the second vane portion 58 rotates from the first rotational position to the second rotational position. In various embodiments, and as shown in FIG. 9B, the second button 150 may have a radius and/or shape which is different than the button 122. For example, the second button 150 may have a radius which is smaller than the radius 140 of the button 122. Accordingly, the second forward axial end 82 of the second vane portion 58 may have an axial displacement 152 which varies along the radial length of the second vane portion 58 as the second vane portion 58 rotates from the first rotational position to the second rotational position. For example, the axial displacement 152 of the second forward axial end 82 may be greater at the outer radial end 66 of the second vane portion 58 than at the inner radial end 68 of the second vane portion 58. In various other embodiments, and as shown in FIG. 9C, the second vane portion 58 may be mounted to the spherical bearing 144 at the inner radial end 68. Accordingly, the second forward axial end 82 of the second vane portion 58 may be axially fixed at the inner radial end 68 and the axial displacement 152 of the second forward axial end 82 may vary along the radial length of the second vane portion 58, to a greater degree than the second vane portion 58 shown in FIG. 9B, as the second vane portion 58 rotates from the first rotational position to the second rotational position.

The variable vane 54 of the present disclosure benefits from changing the circumferential gap to chord length 70 ratio to be more ideal under both high and low power conditions, resulting in reduced pressure loss across the variable vane assembly 52 as well as greater turning of the fluid passing through the variable vane assembly 52. Further, the variable vane assembly 52 may require less closure compared to conventional variable vane assemblies due to reduced air angle deviation at low power.

It should be understood that relative positional terms such as "forward," "aft," "upper," "lower," "above," "below," and the like are with reference to the normal operational attitude of the gas turbine engine and should not be considered otherwise limiting.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A variable vane for rotational equipment having an axial centerline, the variable vane including a pressure side and a suction side opposite the pressure side, the variable vane comprising:

a first vane portion including a first forward axial end and a first aft axial end, the first aft axial end is formed by a vane surface of the first vane portion which extends from a first edge of the first aft axial end to a second edge of the first aft axial end, the first edge is disposed on the pressure side and axially forward of the second edge, the second edge is disposed on the suction side, and the vane surface forms a recess of the first vane portion; and a second vane portion axially adjacent the first vane portion, the second vane portion including a second vane body and a trunnion, the second vane body extending radially between an inner radial end and an outer radial end, the second vane body extending axially between a second forward axial end and a second aft axial end, the second vane body including a first face disposed at the pressure side and a second face disposed at the suction side, each of the first face and the second face extending from the second forward axial end to the second aft axial end, the second vane body having a thickness between the first face and the second face, the thickness determined at a location of maximum thickness between the first face and the second face, and the trunnion including a trunnion axis, a button, and a trunnion portion, the button including an outer perimeter, a button radius, a first button portion, and a second button portion, the outer perimeter surrounding the trunnion axis, the button radius extending between the outer perimeter and the trunnion axis, the button radius greater than two times the thickness, the first button portion spaced from the trunnion axis and forming a first portion of the outer perimeter, the first button portion fixedly in contact with the outer radial end, the second button portion coincident with the trunnion axis and forming a second portion of the outer perimeter, the trunnion portion fixedly mounted to the second button portion at the trunnion axis, the trunnion portion projecting radially outward from the button, the trunnion configured for rotation about the trunnion axis so as to rotate the second vane portion from a first rotational position to a second rotational position relative to the trunnion axis wherein with the second vane portion in the first rotational position, the second forward axial end is located within the recess and axially forward of the first aft axial end.

2. The variable vane of claim 1, wherein the button radius is greater than ten times the thickness.

3. The variable vane of claim 1, wherein the trunnion axis is axially spaced from the first vane portion and circumferentially spaced from the outer radial end.

4. The variable vane of claim 1, wherein the second vane portion is configured to rotate at least forty degrees between a fully open position and a fully closed position.

5. The variable vane of claim 1, wherein the second vane body is spaced from the first vane portion to form a gap between the first vane portion and the second vane body.

6. The variable vane of claim 1, wherein with the second vane portion in the second rotational position, the second forward axial end is axially aft of the first aft axial end.

7. The variable vane of claim 1, wherein the first button portion is fixedly in contact with the outer radial end of the second vane portion at the second forward axial end.

8. A gas turbine engine having an axial centerline, the gas turbine engine comprising:
a variable vane assembly comprising a plurality of variable vanes disposed about the axial centerline, each variable vane of the plurality of variable vanes comprising:
a first vane portion including a first forward axial end and a first aft axial end; and
a second vane portion axially adjacent the first vane portion, the second vane portion including a second vane body and a first trunnion,
the second vane body extending radially between a first radial end and a second radial end, the second vane body extending axially between a second forward axial end and a second aft axial end, the second vane body including a first face and a second face opposite the first face, the first face and the second face extending from the second forward axial end to the second aft axial end, and
the first trunnion including a first trunnion axis, a first button, and a first trunnion portion, the first button fixedly mounted to the first radial end with the first radial end spaced from the first trunnion axis, the first button including a first outer perimeter and a first button radius, the first outer perimeter surrounding the first trunnion axis, the first button radius extending between the first outer perimeter and the first trunnion axis, the first trunnion portion projecting outward from the first button, the first trunnion configured for rotation about the first trunnion axis so as to rotate the second vane portion from an open position of the second vane portion to a closed position of the second vane portion relative to the first trunnion axis;
wherein each variable vane of the plurality of variable vanes includes a chord length extending from the first forward axial end to the second aft axial end, and rotation of the second vane portion from the open position to the closed position increases the chord length.

9. The gas turbine engine of claim 8, wherein the variable vane assembly is located in one or both of a fan section or a compressor section of the gas turbine engine.

10. The gas turbine engine of claim 8, wherein the second vane portion further includes a second trunnion including a second trunnion axis, a second button fixedly in contact with the second radial end, and a second trunnion portion, the second button including a second outer perimeter and a second button radius.

11. The gas turbine engine of claim 10, wherein the second button radius is different than the first radius.

12. The gas turbine engine of claim 11, wherein the second forward axial end is configured to have an axial displacement which varies along a radial length of the second vane portion between the first radial end and the second radial end, as the second vane portion rotates from the open position to the closed position.

13. The gas turbine engine of claim 8, wherein the second vane body has a thickness between the first face and the second face, the thickness is determined at a location of maximum thickness between the first face and the second face, and the first button radius is greater than two times the thickness.

14. The gas turbine engine of claim 8, wherein the first trunnion axis is axially spaced from the first vane portion and circumferentially spaced from the first radial end.

15. A gas turbine engine having an axial centerline, the gas turbine engine comprising:
a variable vane assembly comprising a plurality of variable vanes disposed about the axial centerline, each variable vane of the plurality of variable vanes comprising:
a first vane portion including a first forward axial end and a first aft axial end; and
a second vane portion axially adjacent the first vane portion, the second vane portion including a second vane body, a first trunnion, and a second trunnion,
the second vane body extending radially between a first radial end and a second radial end, the second vane body extending axially between a second forward axial end and a second aft axial end, the second vane body including a first face and a second face opposite the first face, the first face and the second face extending from the second forward axial end to the second aft axial end,
the first trunnion including a first trunnion axis, a first button, and a first trunnion portion, the first button fixedly mounted to the first radial end with the first radial end spaced from the first trunnion axis, the first button including a first outer perimeter and a first button radius, the first outer perimeter surrounding the first trunnion axis, the first button radius extending between the first outer perimeter and the first trunnion axis, the first trunnion portion projecting outward from the first button, the first trunnion configured for rotation about the first trunnion axis so as to rotate the second vane portion from an open position of the second vane portion to a closed position of the second vane portion relative to the first trunnion axis, and
the second trunnion including a second trunnion axis, a second button fixedly in contact fixed the second radial end, and a second trunnion portion, the second button including a second outer perimeter and a second button radius, the second button radius different than the first button radius;
wherein the second forward axial end is configured to have an axial displacement which varies along a radial length of the second vane portion between the first radial end and the second radial end, as the second vane portion rotates from the open position to the closed position.

* * * * *